US006480547B1

(12) United States Patent
Chen et al.

(10) Patent No.: US 6,480,547 B1
(45) Date of Patent: Nov. 12, 2002

(54) SYSTEM AND METHOD FOR ENCODING AND DECODING THE RESIDUAL SIGNAL FOR FINE GRANULAR SCALABLE VIDEO

(75) Inventors: Yingwei Chen, Ossining, NY (US); Mihaela Van Der Schaar, Ossining, NY (US); Hayder Radha, Mahwah, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/419,672

(22) Filed: Oct. 15, 1999

(51) Int. Cl.$^7$ .................................. H04N 7/12
(52) U.S. Cl. ................................ 375/240.27
(58) Field of Search ..................... 375/240.1, 240.16, 375/240.2, 240.27

(56) References Cited

U.S. PATENT DOCUMENTS

| | | | | |
|---|---|---|---|---|
| 5,301,018 | A | 4/1994 | Smidth et al. | 348/420 |
| 5,349,383 | A | 9/1994 | Parke et al. | 348/397 |
| 5,353,061 | A | 10/1994 | Rodriguez et al. | 348/409 |
| 6,256,346 | B1 * | 7/2001 | Yamaguchi et al. | 375/240.12 |
| 6,275,531 | B1 * | 8/2001 | Li | 375/240.12 |

FOREIGN PATENT DOCUMENTS

| | | | |
|---|---|---|---|
| EP | 0739140 A2 | 10/1996 | H04N/7/26 |
| EP | 1030524 A1 | 8/2000 | H04N/7/26 |
| WO | WO9933274 | 7/1999 | H04N/7/26 |
| WO | WO0005898 | 2/2000 | H04N/7/30 |

OTHER PUBLICATIONS

Weiping Li: "Scalable Video Coding with Fine Granularity Scalability" 1999 Digest Of Technical Paper, International Conference on Consumer Electronics (Cat. Co. 99CH36277), 1999 Digest of Technical Papers, International Conference on Consumer Electronics, Los Angeles, CA, USA, Jun. 1999, pp. 306–307, XP000965742.
PHA 23,726, U.S. patent application Ser. No. 09/347,882, filed Jul. 6, 1999 (Discl. 700752).
PHA 23,725, U.S. patent application Ser. No. 09/347,881, filed Jul. 6, 1999 (Discl. 700736).
PHA 23,798, U.S. patent application Ser. No. 09/411,464, filed Oct. 1, 1999 (Discl. 700735).

* cited by examiner

Primary Examiner—Chris Kelley
Assistant Examiner—George Bugg
(74) Attorney, Agent, or Firm—Russell Gross

(57) ABSTRACT

There is disclosed a video encoder and a video decoder. The video encoder comprises base layer circuitry for receiving an input stream of video frames and generating compressed base layer video data for transmission to a streaming video receiver. The base layer video data comprises original transform coefficients (O) associated with the input stream of video frames and reconstructed base layer transform coefficients (B) associated with the original transform coefficients. The video encoder also comprises enhancement layer circuitry for receiving the original transform coefficients (O) and the reconstructed base layer transform coefficients (B) and generating a residual signal (R) proportional to a difference between the original transform coefficients (O) and the reconstructed base layer transform coefficients (B). The enhancement layer circuitry encodes and sends to the streaming video receiver a sign of the residual signal (R) and the bit planes of the residual signal (R). The video decoder comprises base layer circuitry for receiving compressed base layer video data and determining reconstructed base layer transform coefficients (B) associated with a quantization of the base layer video data. The video decoder further comprises enhancement layer circuitry for receiving enhancement layer video data associated with the compressed base layer video data and determining a residual signal (R) and a sign associated with the residual signal (R). The enhancement layer circuitry reconstructs enhancement layer transform coefficients (E) from the residual signal (R) and the plurality of reconstructed base layer transform coefficients (B).

45 Claims, 7 Drawing Sheets

SYSTEM AND METHOD FOR ENCODING AND DECODING THE RESIDUAL SIGNAL FOR FINE GRANULAR SCALABLE VIDEO

CROSS-REFERENCE TO RELATED APPLICATIONS

The present invention is related to those disclosed in:
1. U.S. patent application Ser. No. 09/347,882, entitled "SYSTEM AND METHOD FOR FINE GRANULAR SCALABLE VIDEO WITH SELECTIVE QUALITY ENHANCEMENT," filed on Jul. 6, 1999 now U.S. Case 6,263,022 B1;
2. U.S. patent application Ser. No. 09/347,881, entitled "SYSTEM AND METHOD FOR IMPROVED FINE GRANULAR SCALABLE VIDEO USING BASE LAYER CODING INFORMATION," filed on Jul. 6, 1999; and
3. U.S. patent application Ser. No. 09/411,464, entitled "SYSTEM AND METHOD FOR ENCODING AND DECODING ENHANCEMENT LAYER DATA USING BASE LAYER QUANTIZATION DATA," filed on Oct. 1, 1999.

The foregoing applications are commonly assigned to the assignee of the present invention. The disclosures of the related patent applications are incorporated herein by reference for all purposes as if fully set forth herein.

TECHNICAL FIELD OF THE INVENTION

The present invention is directed, in general, to video encoding systems and, more specifically, to an encoding system and a decoding system for streaming video data.

BACKGROUND OF THE INVENTION

Real-time streaming of multimedia content over data networks, including the Internet, has become an increasingly common application in recent years. A wide range of interactive and non-interactive multimedia applications, such as news-on-demand, live network television viewing, video conferencing, among others, rely on end-to-end streaming video techniques. Unlike a "downloaded" video file, which may be retrieved first in "non-real" time and viewed or played back later in "real" time, streaming video applications require a video transmitter that encodes and transmits a video signal over a data network to a video receiver, which must decode and display the video signal in real time.

Scalable video coding is a desirable feature for many multimedia applications and services that are used in systems employing decoders with a wide range of processing power. Scalability allows processors with low computational power to decode only a subset of the scalable video stream. Another use of scalable video is in environments with a variable transmission bandwidth. In those environments, receivers with low-access bandwidth receive, and consequently decode, only a subset of the scalable video stream, where the amount of that subset is proportional to the available bandwidth.

Several video scalability approaches have been adopted by lead video compression standards such as MPEG-2 and MPEG-4. Temporal, spatial and quality (e.g., signal-noise ratio (SNR)) scalability types have been defined in these standards. All of these approaches consist of a base layer (BL) and an enhancement layer (EL). The base layer part of the scalable video stream represents, in general, the minimum amount of data needed for decoding that stream. The enhanced layer part of the stream represents additional information, and therefore enhances the video signal representation when decoded by the receiver.

For example, in a variable bandwidth system, such as the Internet, the base layer transmission rate may be established at the minimum guaranteed transmission rate of the variable bandwidth system. Hence, if a subscriber has a minimum guaranteed bandwidth of 256 kbps, the base layer rate may be established at 256 kbps also. If the actual available bandwidth is 384 kbps, the extra 128 kbps of bandwidth may be used by the enhancement layer to improve on the basic signal transmitted at the base layer rate.

For each type of video scalability, a certain scalability structure is identified. The scalability structure defines the relationship among the pictures of the base layer and the pictures of the enhanced layer. One class of scalability is fine-granular scalability. Images coded with this type of scalability can be decoded progressively. In other words, the decoder may decode and display the image with only a subset of the data used for coding that image. As more data is received, the quality of the decoded image is progressively enhanced until the complete information is received, decoded, and displayed.

The proposed MPEG-4 standard is directed to video streaming applications based on very low bit rate coding, such as video-phone, mobile multimedia/audio-visual communications, multimedia e-mail, remote sensing, interactive games, and the like. Within the MPEG-4 standard, fine-granular scalability (FGS) has been recognized as an essential technique for networked video distribution. FGS primarily targets applications where video is streamed over heterogeneous networks in real-time. It provides bandwidth adaptivity by encoding content once for a range of bit rates, and enabling the video transmission server to change the transmission rate dynamically without in-depth knowledge or parsing of the video bit stream.

An important priority within conventional FGS techniques is improving coding efficiency and visual quality of the intra-frame coded enhancement layer. This is necessary to justify the adoption of FGS techniques for the compression of the enhancement layer in place of non-scalable (e.g., single layer) or less granular (e.g., multi-level SNR scalability) coding methods.

Many video coding techniques have been proposed for the FGS compression of the enhancement layer, including wavelets, bit-plane DCT and matching pursuits. At the MPEG-4 meeting in Seoul, Korea in March 1999, the bit-plane DCT solution proposed by Optivision was selected as a reference. The bit-plane coding scheme adopted as reference for FGS includes the following steps at the encoder side:

1. residual computation in the DCT domain, by subtracting from each original DCT coefficient the reconstructed DCT coefficient after base-layer quantization and dequantization;
2. determining the maximum value of all of the absolute values of the residual signal in a video object plane (VOP) and the maximum number of bits n to represent this maximum value;
3. for each block within the VOP, representing each absolute value of the residual signal with n bits in the binary format and forming n bit-planes;
4. bit-plane encoding of the residual signal absolute values; and
5. sign encoding of the DCT coefficients which are quantized to zero in the base-layer.

These coding steps are reversed at the decoder side. It is important to note that the current implementation of the bit-plane coding of DCT coefficients depends on base-layer quantization information. The input signal to the enhancement layer is computed primarily as the difference between the original DCT coefficients of the motion compensated picture and those of the lower quantization cell boundaries used during base layer encoding (this is true when the base layer reconstructed DCT coefficient is non-zero; otherwise zero is used as the subtraction value). The enhancement layer signal, herein referred to as the "residual" signal is then compressed bit plane by bit plane. Since the lower quantization cell boundary is used as the "reference" signal for computing the residual signal, the residual signal is always positive, except when the base layer DCT is quantized to zero. Thus, it not necessary to code the sign bit of the residual signal.

One major disadvantage of the existing methods of encoding and decoding streaming video is its complexity. A large amount of information, such as quantization parameters, must be transmitted between the base layer encoder and the enhancement layer encoder, and between the base layer decoder and the enhancement layer decoder. Furthermore, the coding and decoding of the residual signal in the enhancement layer is a conditional operation that depends on whether or not the base layer DCT is quantized to zero. This adds additional complexity to the coder/decoder (i.e., codec) used.

There is therefore a need in the art for improved encoders and encoding techniques for use in streaming video systems. In particular, there is a need for encoders and decoders that use a simpler method to code and decode the residual signal. More particularly, there is a need for encoding techniques that are not based on whether the base layer DCT is quantized to zero. There is a further need for decoding techniques that are not based on whether the base layer DCT is quantized to zero.

SUMMARY OF THE INVENTION

To address the above-discussed deficiencies of the prior art, it is a primary object of the present invention to provide a new technique for reducing the complexity of an enhancement layer compression scheme. The present invention proposes a technique for reducing the complexity of the bit-plane compression scheme of, for example, the residual DCT coefficients currently adopted as a reference within the MPEG-4 standard. However, it is important to realize that the proposed improvements are not limited to the DCT transform. Those skilled in the art will readily understand that the principles of the present invention may also be successfully applied to other transforms (e.g., wavelets) for the compression of the base and enhancement layer. However, in the descriptions that follow, DCT coefficients are employed for illustration purposes only.

Accordingly, in an advantageous embodiment of the present invention, there is provided a video encoder comprising base layer circuitry capable of receiving an input stream of video frames and generating therefrom compressed base layer video data suitable for transmission to a streaming video receiver. The base layer video data comprises a plurality of original transform coefficients (O) associated with the input stream of video frames and a plurality of reconstructed base layer transform coefficients (B) generated by quantizing and de-quantizing the plurality of original transform coefficients. The video encoder further comprises enhancement layer circuitry capable of receiving the plurality of original transform coefficients (O) and the plurality of reconstructed base layer transform coefficients (B) and generating therefrom a residual signal (R). The residual signal (R) is proportional to a difference between the plurality of original transform coefficients (O) and the plurality of reconstructed base layer transform coefficients (B). The enhancement layer circuitry encodes and sends a sign of the residual signal (R) to the streaming video receiver.

In one embodiment of the present invention, the base layer circuitry comprises a transform circuit capable of generating the plurality of original transform coefficients (O).

In another embodiment of the present invention, the transform circuit is a discrete cosine transform (DCT) circuit.

In still another embodiment of the present invention, the base layer circuitry comprises a quantization circuit and an inverse quantization circuit capable of generating from the plurality of original transform coefficients (O) the plurality of reconstructed base layer transform coefficients (B).

In yet another embodiment of the present invention, the enhancement layer circuitry comprises a residual computation circuit capable of comparing the plurality of original transform coefficients (O) and the plurality of reconstructed base layer transform coefficients (B).

The present invention also may be embodied in a decoder. According to an advantageous embodiment of the present invention, there is provided a video decoder comprising base layer circuitry capable of receiving compressed base layer video data and determining therefrom a plurality of reconstructed base layer transform coefficients (B) generated by quantizing and de-quantizing the base layer video data. The video decoder further comprises enhancement layer circuitry capable of receiving enhancement layer video data associated with the compressed base layer video data and determining therefrom a residual signal (R) and a sign associated with the residual signal (R). The enhancement layer circuitry is further capable of reconstructing a plurality of enhancement layer transform coefficients (E) from the residual signal (R) and the plurality of reconstructed base layer transform coefficients (B).

In one embodiment of the present invention, the enhancement layer circuitry comprises an inverse transform circuit capable of generating from the plurality of reconstructed enhancement layer transform coefficients (E) a plurality of decompressed enhancement layer video frames.

In another embodiment of the present invention, the inverse transform circuit is an inverse discrete cosine transform (IDCT) circuit.

In still another embodiment of the present invention, the enhancement layer circuitry comprises a computation circuit capable of adding the residual signal (R) and the plurality of reconstructed base layer transform coefficients (B).

In yet another embodiment of the present invention, the enhancement layer circuitry comprises an enhancement layer decoding circuit capable of receiving the enhancement layer video data and determining therefrom the residual signal (R) and the sign associated with the residual signal (R).

The foregoing has outlined rather broadly the features and technical advantages of the present invention so that those skilled in the art may better understand THE DETAILED DESCRIPTION OF THE INVENTION that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise" and derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller," "processor," or "apparatus" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged video encoder and video decoder.

Figure 1:
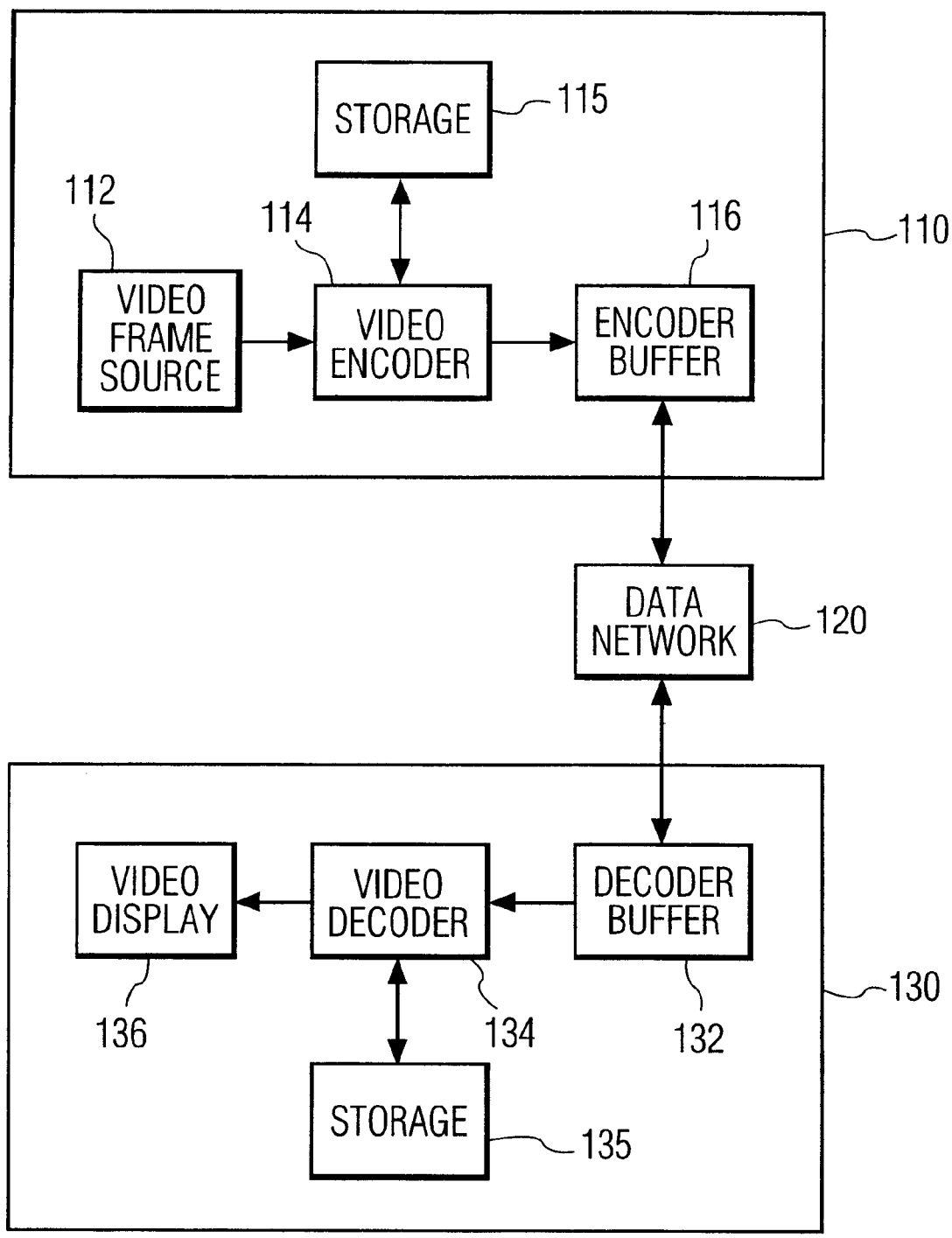
FIG. 1 illustrates an end-to-end transmission of streaming video from a streaming video transmitter through a data network to a streaming video receiver, according to one embodiment of the present invention.

FIG. 1 illustrates a video transmission system for an end-to-end transmission of streaming video from streaming video transmitter 110 through data network 120 to one or more streaming video receivers, such as exemplary streaming video receiver 130, according to one embodiment of the present invention. Depending on the application, streaming video transmitter 110 may be any one of a wide variety of sources of video frames, including a data network server, a television station transmitter, a cable network, a desktop personal computer (PC), or the like.

Streaming video transmitter 110 comprises video frame source 112, video encoder 114, storage 115, and encoder buffer 116. Video frame source 112 may be any device capable of generating a sequence of uncompressed video frames, including a television antenna and receiver unit, a video cassette player, a video camera, a disk storage device capable of storing a "raw" video clip, and the like. The uncompressed video frames enter video encoder 114 at a given picture rate (or "streaming rate") and are compressed according to any known compression algorithm or device, such as an MPEG-4 encoder. Video encoder 114 then transmits the compressed video frames to encoder buffer 116 for buffering in preparation for transmission across data network 120. Data network 120 may be any suitable network and may include portions of both public data networks, such as the Internet, and private data networks, such as an enterprise-owned local area network (LAN) or wide area network (WAN).

Streaming video receiver 130 comprises decoder buffer 132, video decoder 134, storage 135, and video display 136. Depending on the application, streaming video receiver may be any one of a wide variety of receivers of video frames, including a television receiver, a desktop personal computer (PC), a video cassette recorder (VCR), or the like. Decoder buffer 132 receives and stores streaming compressed video frames from data network 120. Decoder buffer 132 then transmits the compressed video frames to video decoder 134 as required. Video decoder 134 decompresses the video frames at the same rate (ideally) at which the video frames were compressed by video encoder 114. Video decoder 134 sends the decompressed frames to video display 136 for play-back on the screen of video display 134.

In an advantageous embodiment of the present invention, video encoder 114 may be implemented as a software program executed by a conventional data processor, such as a standard MPEG encoder. In such an implementation, video encoder 114 may comprise a plurality of computer executable instructions stored in storage 115. Storage 115 may comprise any type of computer storage medium, including a fixed magnetic disk, a removable magnetic disk, a CD-ROM, magnetic tape, video disk, and the like. Furthermore, in an advantageous embodiment of the present invention, video decoder 134 also may be implemented as a software program executed by a conventional data processor, such as a conventional MPEG decoder. In such an implementation, video decoder 134 may comprise a plurality of computer executable instructions stored in storage 135. Storage 135 also may comprise any type of computer storage medium, including a fixed magnetic disk, a removable magnetic disk, a CD-ROM, magnetic tape, video disk, and the like.

Figure 2:
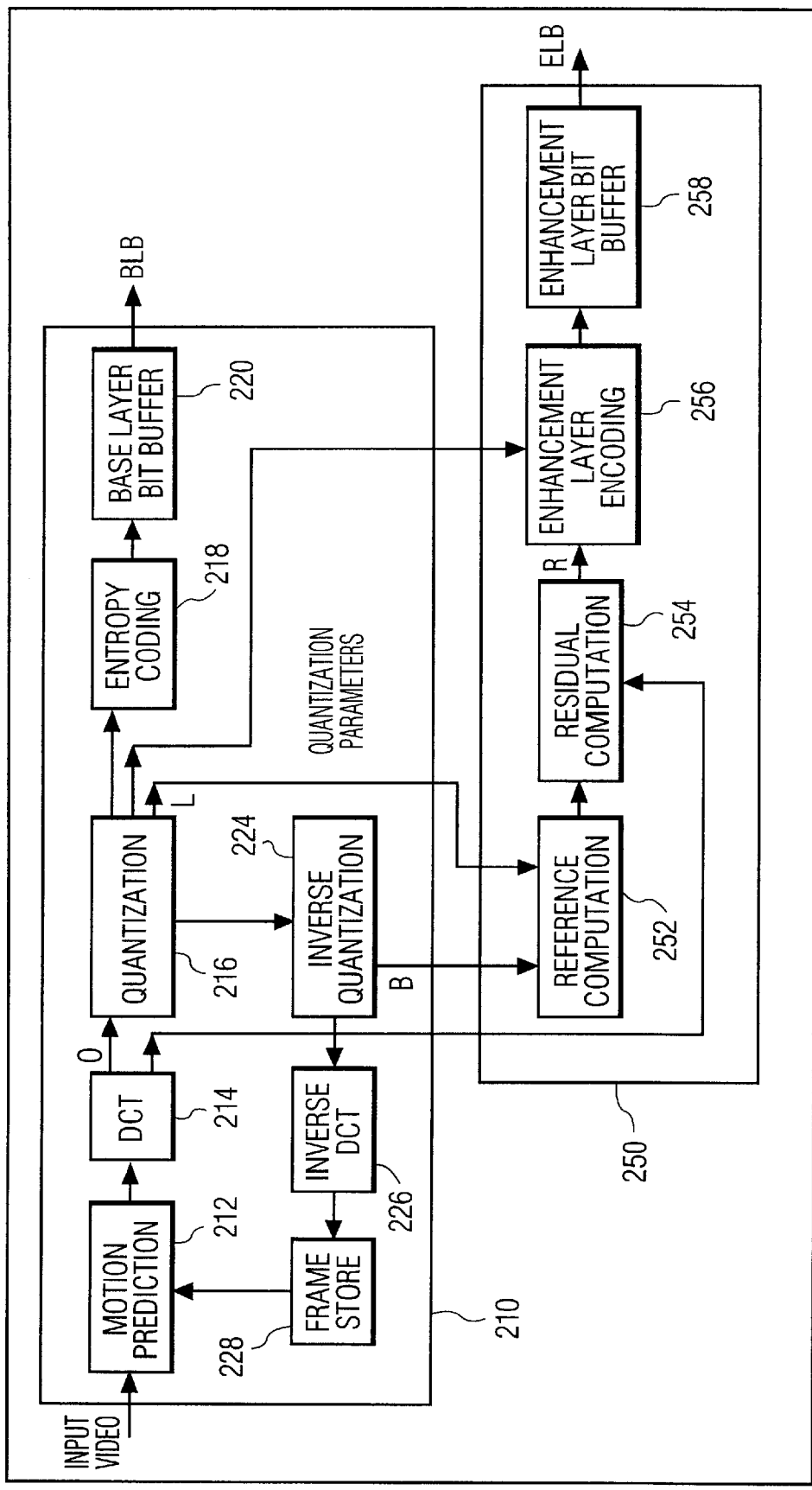
FIG. 2 illustrates an exemplary fine granular scalability (FGS) encoder according to one embodiment of the prior art.

FIG. 2 illustrates exemplary video encoder 200 according to one embodiment of the prior art. Video encoder 200 comprises base layer encoding unit 210 and enhancement layer encoding unit 250. Video encoder 200 receives an original video signal that is transferred to base layer encoding unit 210 for generation of a base layer bit stream and to enhancement layer encoding unit 250 for generation of an enhancement layer bit stream.

Base layer encoding unit 210 contains a main processing branch, comprising motion prediction circuit 212, discrete cosine transform (DCT) circuit 214, quantization circuit 216, entropy coding circuit 218, and base layer bit buffer 220, that generates the base layer bit stream. Base layer encoding unit 210 also contains a feedback branch comprising inverse quantization circuit 224, inverse discrete cosine transform (IDCT) circuit 226, and frame store circuit 228.

Motion prediction circuit 212 receives the original video signal and estimates the amount of motion between a reference frame provided by frame store 228, and the present video frame as represented by changes in pixel characteristics. For example, the MPEG standard specifies that motion information may be represented by one to four spatial motion vectors per 16×16 sub-block of the frame. DCT circuit 214 receives the resultant motion difference estimate output from motion prediction circuit 212 and transforms it from a spatial domain to a frequency domain using known de-correlation techniques such as discrete cosine transform (DCT).

Quantization circuit 216 receives the original DCT coefficient outputs (designated "O") from DCT circuit 214 and further compresses the motion compensation prediction information using well-known quantization techniques. Quantization circuit 216 determines a division factor to be applied for quantization of the transform output. The output of quantization circuit 216 includes the lower quantization cell boundary value (designated "L") for each original DCT coefficient.

Next, entropy coding circuit 218 receives the quantized DCT coefficients from quantization circuit 216 and further compresses the data using variable length coding techniques that represent areas with a high probability of occurrence with a relatively short code and that represent areas of lower probability of occurrence with a relatively long code. Base layer bit buffer 220 receives the output of entropy coder 218 and provides necessary buffering for output of the compressed base layer bitstream (BLB).

Inverse quantization circuit 224 de-quantizes the output of quantization circuit 216 to produce a signal that is representative of the transform input to quantization circuit 216. This signal comprises the reconstructed base layer DCT coefficients (designated "B"). As is well known, the inverse quantization process is a "lossy" process, since the bits lost in the division performed by quantization circuit 216 are not recovered. IDCT circuit 226 decodes the output of inverse quantization circuit 224 to produce a signal which provides a frame representation of the original video signal as modified by the transform and quantization processes. Frame store circuit 228 receives the decoded representative frame from inverse transform circuit 226 and stores the frame as a reference output to motion prediction circuit 212. Motion prediction circuit 212 uses the stored frame as the input reference signal for determining motion changes in the original video signal.

Enhancement layer encoding unit 250 comprises reference computation circuit 252, residual computation circuit 254, enhancement layer encoding circuit 256, and enhancement layer bit buffer 258. Reference computation circuit 252 and residual computation circuit 254 receive the original DCT coefficients (O), the lower quantization cell boundary values (L) and the reconstructed base layer DCT coefficients (B) and generate therefrom the residual signal (designated "R") at the output of residual computation circuit 254. The residual signal is computed as follows: If the reconstructed base layer DCT coefficients (B) are equal to zero (B=0), then the residual signal is the original DCT coefficient (R=O). Otherwise, the residual signal (R) is equal to the difference between the original DCT coefficients (O) and the lower quantization cell boundary values (L) (i.e., R=O−L).

The residual signal (R), representing image information which is missing in the reconstructed base layer frames as a result of the transform and quantization processes, is then encoded in enhancement layer encoding circuit 256. If the reconstructed base layer DCT coefficients (B) are equal to zero (B=0), then enhancement layer encoding circuit 256 encodes and sends the sign of the residual signal (R) and subsequently sends the bit planes of the residual signal. If the reconstructed base layer DCT coefficients (B) are non-zero, then enhancement layer encoding circuit 256 simply encodes and sends the bit planes of the residual signal. The encoded residual signal is stored in enhancement layer bit buffer 258 for transmission. The output of enhancement layer bit buffer 258 is the enhancement layer bitstream (ELB).

Figure 3:
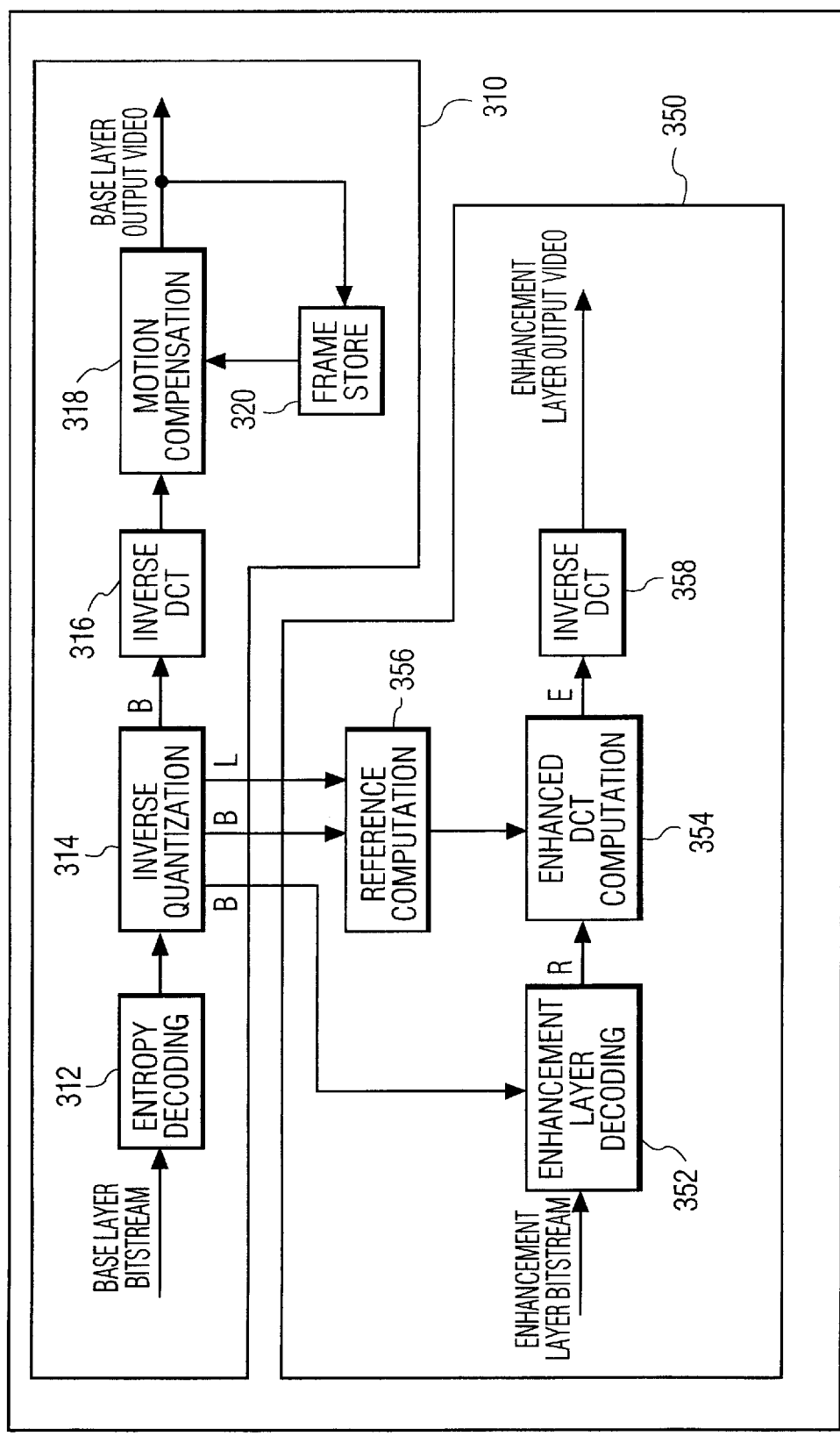
FIG. 3 illustrates an exemplary fine granular scalability (FGS) decoder according to one embodiment of the prior art.

FIG. 3 illustrates exemplary video decoder 300 according to one embodiment of the prior art. Exemplary video decoder 300 comprises base layer decoding unit 310 and enhancement layer decoding unit 350. Base layer decoding unit 310 comprises entropy decoding circuit 312, inverse quantization circuit 314, inverse discrete cosine transform (IDCT) circuit 316, motion compensation circuit 318 and frame store circuit 320.

Entropy decoding unit 312 receives the base layer bit stream and reverses the entropy coding process from the base layer in video encoder 300 to produce a quantized data signal similar to the output of quantization circuit 216 in base layer encoding unit 210. The quantized signal at the output of entropy decoding circuit 312 contains information such as motion information, quantization step size, and type of macro-block. Inverse quantization circuit 314 accepts the decoded quantized (de-quantized) output of entropy decoding circuit 312 and performs an inverse quantization to produce a partially de-compressed signal equivalent to the reconstructed base layer DCT coefficients (B) produced by inverse quantization circuit 224. Inverse quantization circuit 314 also outputs the lower quantization cell boundary values (L) to enhancement layer decoding unit 350, as described below.

IDCT circuit 316 receives the reconstructed base layer DCT coefficients (B) from inverse quantization circuit 314 and performs an inverse discrete cosine transform operation. The inverse transform produces an output signal representing the decompressed motion signal for the original video input signal to exemplary video encoder 200. The decompressed motion compensation signal is received by motion compensation circuit 318, which generates base layer video frames therefrom that are eventually combined with enhancement layer data and sent to a video display. The base layer video frames are also stored in frame store circuit 320 and fed back to motion compensation circuit 318 for use in generating subsequent base layer video frames.

Enhancement layer decoding unit 350 comprises enhancement layer decoding unit 352, enhanced DCT computation circuit 354, reference computation circuit 356, and inverse discrete cosine transform (IDCT) circuit 358. Enhancement layer decoding circuit 352 receives the enhancement layer bit stream input from a decoder buffer and the reconstructed base layer DCT coefficients (B) generated by inverse quantization circuit 314 and generates the residual signal (R). If the reconstructed base layer DCT coefficients are zero (B=0), then enhancement layer decoding circuit 352 decodes the sign of the residual signal (R) and subsequently decodes the bit planes of the residual signal (R). If the reconstructed base layer DCT coefficients are non-zero, then enhancement layer decoding circuit 352 simply decodes the bit planes of the residual signal (R).

Reference computation circuit 356 receives the lower quantization cell boundary values (L) and the reconstructed base layer DCT coefficients (B) and uses these values to control the generation of the enhancement layer decoded and reconstructed DCT coefficients (E) by enhanced DCT computation circuit 354. If the reconstructed base layer DCT coefficients are zero (B=0), then the enhancement layer decoded and reconstructed DCT coefficients (E) are equal to the residual signal (R) from enhancement layer decoding circuit 352 (E=R). If the reconstructed base layer DCT coefficients are zero (B=0), then the enhancement layer decoded and reconstructed DCT coefficients (E) are equal to the sum of the residual signal (R) from enhancement layer decoding circuit 352 and the lower quantization cell boundary values (L) received from inverse quantization circuit 314 (E=R+L). The enhancement layer decoded and reconstructed DCT coefficients (E) are then inverse transformed by IDCT 358 to produce enhancement layer output video frames that may subsequently be combined with base layer video frames and sent to a video display.

As can be seen from the foregoing, the computation, encoding, decoding, and reconstruction of enhancement layer data depend heavily on whether the base layer reconstructed DCT coefficients are non-zero, as well as on the quantization parameters (L) used. The present invention provides an improved encoder and an improved decoder that eliminate these dependencies.

Figure 4:
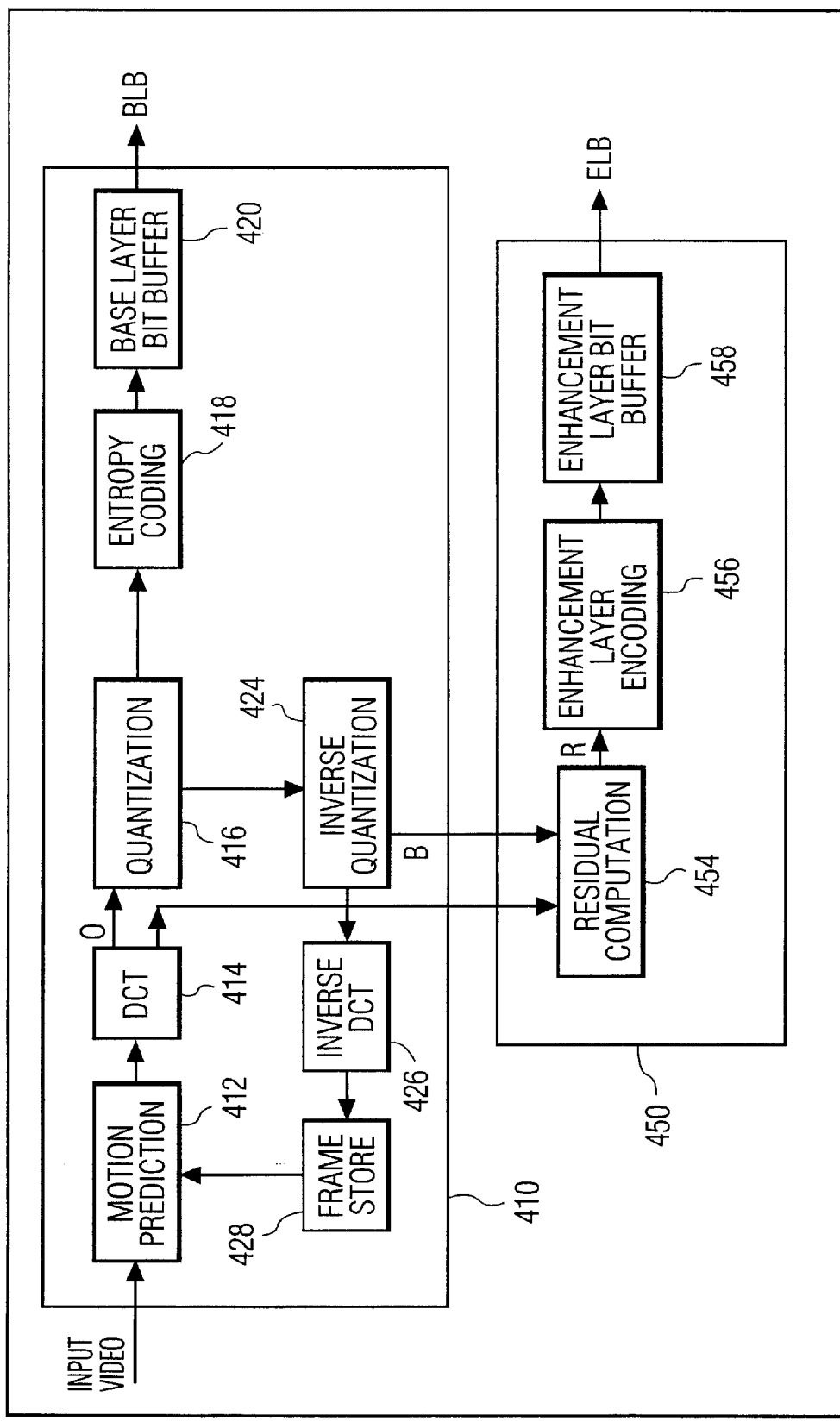
FIG. 4 illustrates an exemplary fine granular scalability (FGS) encoder according to one embodiment of the present invention.

FIG. 4 illustrates exemplary video encoder 114 according to one embodiment of the present invention. Video encoder 114 comprises base layer encoding unit 410 and enhancement layer encoding unit 450. Video encoder 114 receives an original video signal that is transferred to base layer encoding unit 410 for generation of a base layer bit stream and to enhancement layer encoding unit 450 for generation of an enhancement layer bit stream.

Base layer encoding unit 410 contains a main processing branch, comprising motion prediction circuit 412, discrete cosine transform (DCT) circuit 414, quantization circuit 416, entropy coding circuit 418, and base layer bit buffer 420, that generates the base layer bit stream (BLB). Base layer encoding unit 410 also contains a feedback branch comprising inverse quantization circuit 424, inverse discrete cosine transform (IDCT) circuit 426, and frame store circuit 428. The components in base layer encoding unit 410 are functionally equivalent to corresponding components in base layer encoding unit 210 in prior art video encoder 200. For the purposes of simplicity and brevity in describing the present invention, the components of base layer encoding unit 410 will not be described in further detail, since such description would be redundant. It is sufficient to say that base layer encoding unit 410 generates original DCT coefficients (O) and reconstructed base layer DCT coefficients (B) in a manner similar to base layer encoding unit 210 in prior art video encoder 200.

Enhancement layer encoding unit 450 comprises residual computation circuit 454, enhancement layer encoding circuit 456, and enhancement layer bit buffer 458. As in the case of base layer encoding unit 410, the components in enhancement layer encoding unit 450 are functionally equivalent to corresponding components in enhancement layer encoding unit 250 in prior art video encoder 200. Again, for the purposes of simplicity and brevity in describing the present invention, the general operations of the components of enhancement layer encoding unit 450 will not be described in further detail, since such description would be redundant.

The present invention has eliminated the reference computation circuit 252 found in the prior art video encoder 200. Residual computation circuit 454 receives the original DCT coefficients (O) and the reconstructed base layer DCT coefficients (B) and generates therefrom the residual signal (designated "R") at the output of residual computation circuit 454. The residual signal (R) is the difference between the original DCT coefficients (O) and the reconstructed base layer DCT coefficients (B) (i.e., R=O−B).

The residual signal (R), representing image information which is missing in the reconstructed base layer frames as a result of the transform and quantization processes, is then encoded in enhancement layer encoding circuit 456. Enhancement layer encoding circuit 456 encodes and sends the sign of the residual signal (R) and subsequently encodes and sends the bit planes of the residual signal. The encoded residual signal is stored in enhancement layer bit buffer 458 for transmission. The output of enhancement layer bit buffer 458 is the enhancement layer bitstream (ELB).

Figure 5:
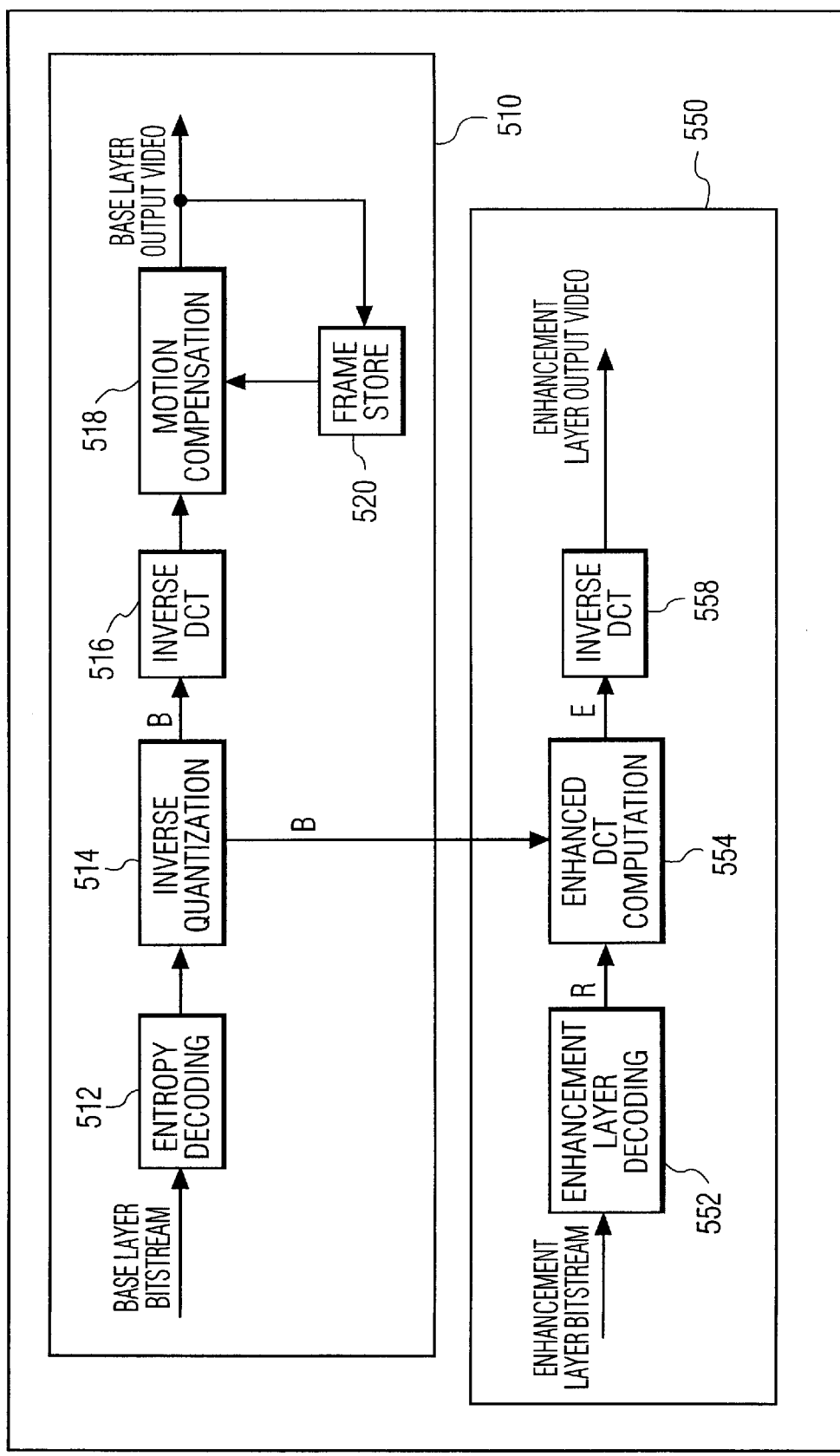
FIG. 5 illustrates an exemplary fine granular scalability (FGS) decoder according to one embodiment of the present invention.

FIG. 5 illustrates exemplary video decoder 134 according to one embodiment of the present invention. Exemplary video decoder 134 comprises base layer decoding unit 510 and enhancement layer decoding unit 550. Base layer decoding unit 510 comprises entropy decoding circuit 512, inverse quantization circuit 514, inverse discrete cosine transform (IDCT) circuit 516, motion compensation circuit 518 and frame store circuit 520. The components in base layer decoding unit 510 are functionally equivalent to corresponding components in base layer decoding unit 310 in prior art video decoder 300. For the purposes of simplicity and brevity in describing the present invention, the components of base layer decoding unit 510 will not be described in further detail, since such description would be redundant. It is sufficient to say that base layer decoding unit 510 generates reconstructed base layer DCT coefficients (B) in a manner similar to base layer decoding unit 310 in prior art video decoder 300.

Enhancement layer decoding unit 550 comprises enhancement layer decoding unit 552, enhanced DCT computation circuit 554, and inverse discrete cosine transform (IDCT) circuit 558. As in the case of base layer decoding unit 510, the components in enhancement layer decoding unit 550 are functionally equivalent to corresponding components in enhancement layer decoding unit 350 in prior art video decoder 300. Again, for the purposes of simplicity and brevity in describing the present invention, the components of enhancement layer encoding unit 550 will not be described in further detail, since such description would be redundant.

The present invention has eliminated reference computation circuit 356 found in prior art decoder 300. Enhancement layer decoding circuit 552 receives the enhancement layer bit stream input from a decoder buffer and generates the residual signal (R). Enhancement layer decoding circuit 552 decodes the input sign of the residual signal (R) and subsequently decodes the bit planes of the residual signal (R). Enhanced DCT computation circuit 554 receives the residual signal (R) and generates the enhancement layer decoded and reconstructed DCT coefficients (E).

The enhancement layer decoded and reconstructed DCT coefficients (E) are equal to the sum of the residual signal (R) from enhancement layer decoding circuit 552 and the reconstructed base layer DCT coefficients (B) received from inverse quantization circuit 514 in base layer decoding unit 510. The enhancement layer decoded and reconstructed DCT coefficients (E) are then inverse transformed by IDCT 558 to produce enhancement layer output video frames that may subsequently be combined with base layer video frames and sent to a video display.

Figure 6:
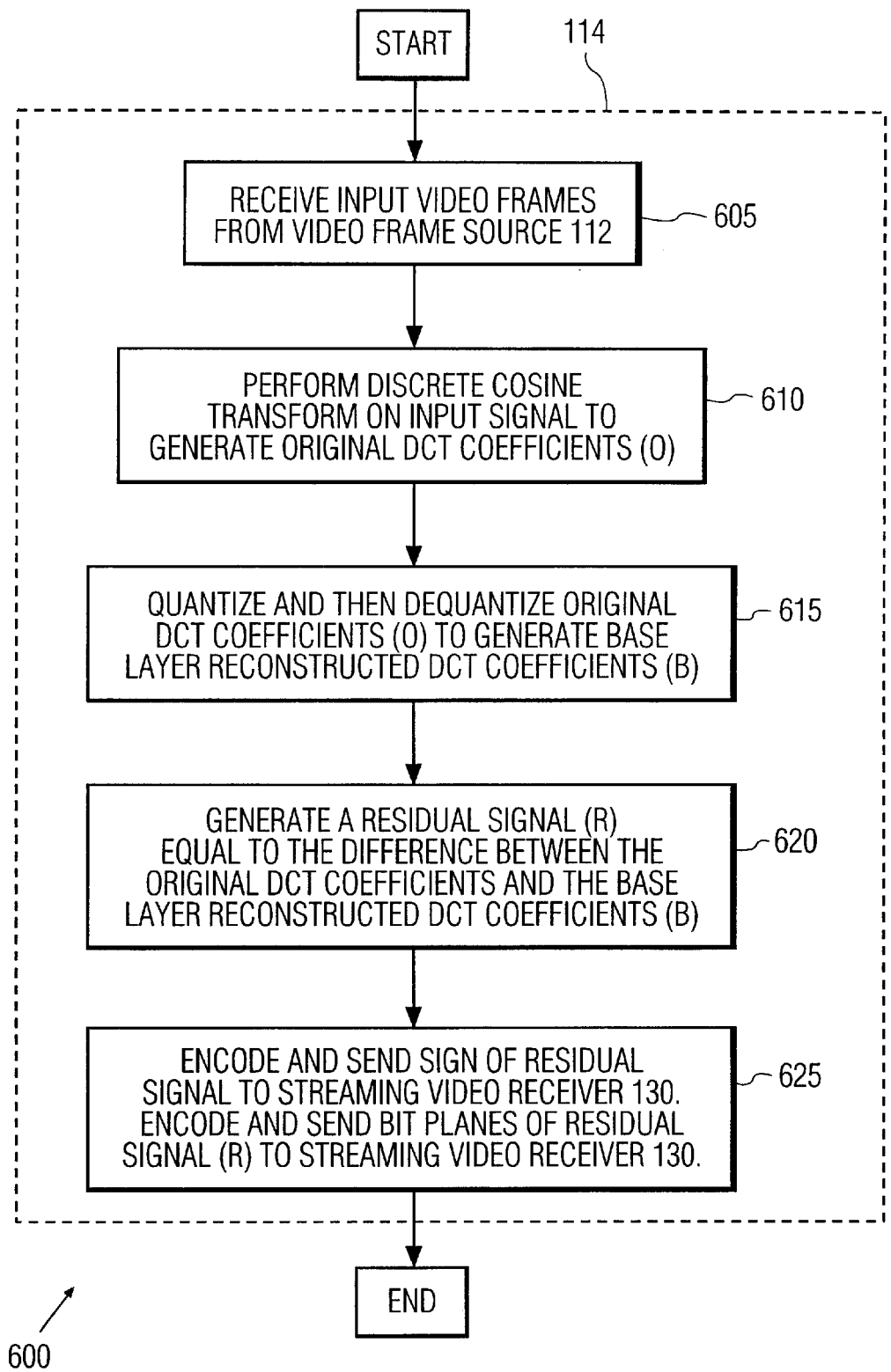
FIG. 6 is a flow chart illustrating an exemplary encoding operation in the exemplary encoder in FIG. 4 according to one embodiment of the present invention.

FIG. 6 depicts flow chart 600, which illustrates an exemplary encoding operation in encoder 114 according to one embodiment of the present invention. Encoder 114 receives input vide frames from video frame source 112. Motion prediction circuit 412 predicts difference between the received frame and previous frames and transmits these values to DCT circuit 414 (process step 605). DCT circuit 414 performs a discrete cosine transform operation on the input video frame signals (after motion prediction by motion prediction circuit 312) and generates DCT coefficients (O) for the original video signal (process step 610).

Encoder 114 then quantizes and dequantizes the original DCT coefficients (O) using quantization circuit 416 and inverse quantization circuit 424. This produces reconstructed base layer DCT coefficients (B) that are transferred to inverse DCT circuit 426 and residual computation circuit 454 (process step 615). Next, residual computation circuit 454 generates a residual signal (R) equal to the difference between the original DCT coefficients (O) and the reconstructed base layer DCT coefficients (B) (process step 620). Enhancement layer encoding circuit 456 subsequently encodes the sign and bit planes of residual signal (R) and transfers these to enhancement layer bit buffer 458 for output to streaming video receiver 130 (process step 625).

Figure 7:
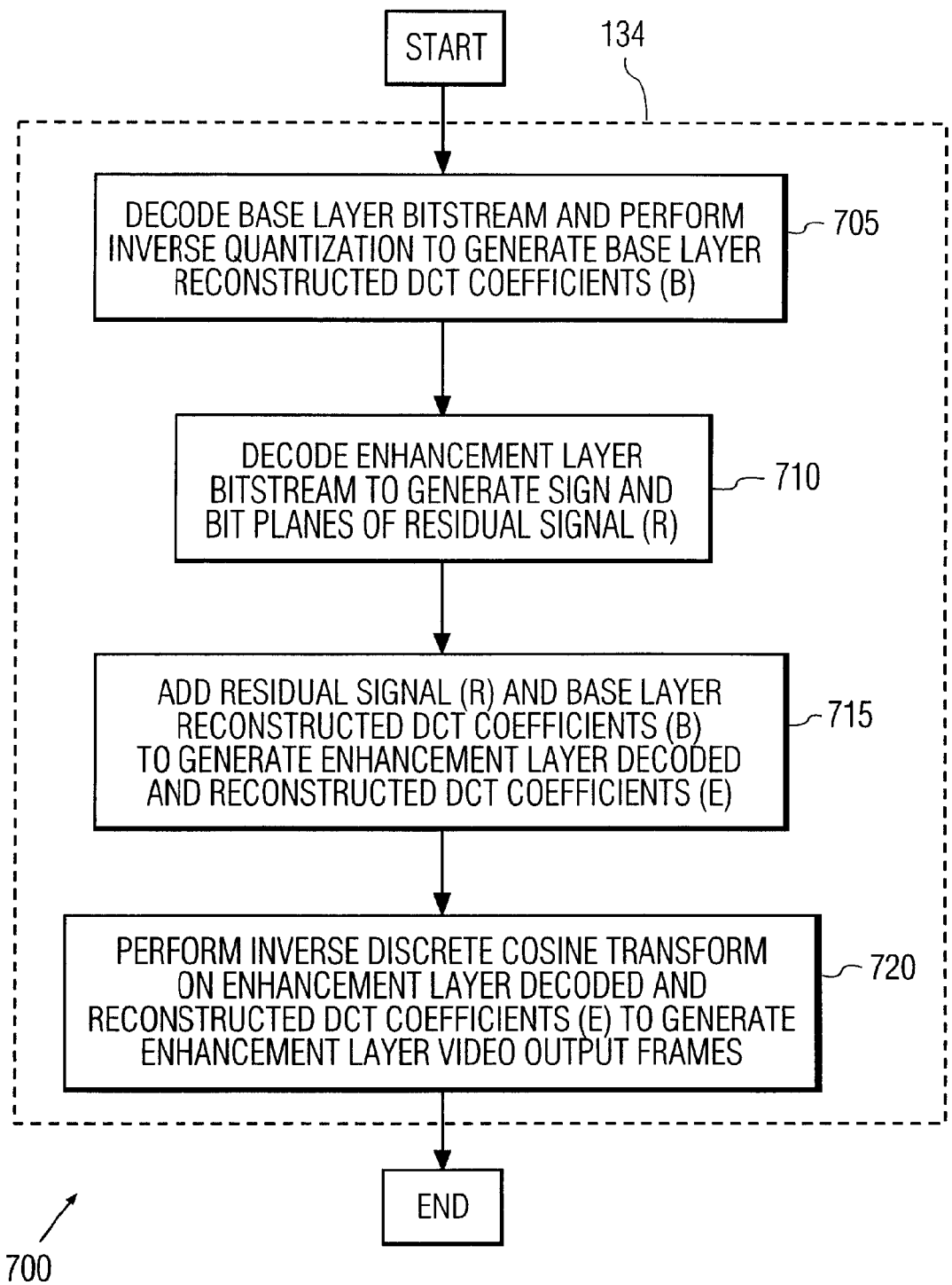
FIG. 7 is a flow chart illustrating an exemplary encoding operation in the exemplary decoder in FIG. 5 according to one embodiment of the present invention.

FIG. 7 depicts flow chart 700, which illustrates an exemplary decoding operation in decoder 134 associated with video receiver 130 according to one embodiment of the present invention. Base layer decoding unit 510 decodes an incoming base layer bitstream and performs an inverse quantization operation on the decoded values to produce reconstructed base layer DCT coefficients (B) (process step 705). Base layer decoding unit 510 then applies standard inverse DCT and motion compensation processes to the produce reconstructed base layer DCT coefficients (B) coefficients to recreate the base layer output video signal.

Enhancement layer decoding circuit 552 decodes the incoming enhancement layer bitstream from enhancement layer bit buffer 458 to recreate the sign and bit planes for the residual signal (R) (process step 710). Enhanced DCT computation circuit 554 adds the residual signal (R) to the reconstructed base layer DCT coefficients (B) to produce the enhancement layer decoded and reconstructed DCT coefficients (E) (process step 715). Finally, IDCT circuit 558 performs an inverse discrete cosine transform on the enhancement layer decoded and reconstructed DCT coefficients (E) to create the enhancement layer output video frames for storage and/or transfer to video display 136 (process step 720).

Although the present invention has been described in detail, those skilled in the art should understand that they can make various changes, substitutions and alterations herein without departing from the spirit and scope of the invention in its broadest form.

What is claimed is:

1. A video encoder comprising:

base layer circuitry capable of receiving an input stream of video frames and generating therefrom compressed base layer video data suitable for transmission to a streaming video receiver, said base layer video data comprising a plurality of original transform coefficients (O) associated with said input stream of video frames and a plurality of reconstructed base layer transform coefficients (B) generated by quantizing and de-quantizing said plurality of original transform coefficients (O); and enhancement layer circuitry capable of receiving said plurality of original transform coefficients (O) and said plurality of reconstructed base layer transform coefficients (B) and generating therefrom a residual signal (R) proportional to a difference between said plurality of original transform coefficients (O) and said plurality of reconstructed base layer transform coefficients (B), wherein said enhancement layer circuitry encodes and sends a sign of said residual signal (R) to said streaming video receiver.

2. The video encoder set forth in claim 1 wherein said base layer circuitry comprises a transform circuit capable of generating said plurality of original transform coefficients (O).

3. The video encoder set forth in claim 2 wherein said transform circuit is a discrete cosine transform (DCT) circuit.

4. The video encoder set forth in claim 1 wherein said base layer circuitry comprises a quantization circuit and an inverse quantization circuit capable of generating from said plurality of original transform coefficients (O) said plurality of reconstructed base layer transform coefficients (B).

5. The video encoder set forth in claim 1 wherein said enhancement layer circuitry comprises a residual computation circuit capable of comparing said plurality of original transform coefficients (O) and said plurality of reconstructed base layer transform coefficients (B).

6. A video decoder comprising:

base layer circuitry capable of receiving compressed base layer video data and determining therefrom a plurality of reconstructed base layer transform coefficients (B) associated with a quantization of said compressed base layer video data; and enhancement layer circuitry capable of receiving enhancement layer video data associated with said compressed base layer video data and determining therefrom a residual signal (R) and a sign associated with said residual signal (R), wherein said enhancement layer circuitry is further capable of reconstructing a plurality of enhancement layer transform coefficients (E) from said residual signal (R) and said plurality of reconstructed base layer transform coefficients (B).

7. The video decoder set forth in claim 6 wherein said enhancement layer circuitry comprises an inverse transform circuit capable of generating from said plurality of reconstructed enhancement layer transform coefficients (E) a plurality of decompressed enhancement layer video frames.

8. The video decoder set forth in claim 7 wherein said inverse transform circuit is an inverse discrete cosine transform (IDCT) circuit.

9. The video decoder set forth in claim 6 wherein said enhancement layer circuitry comprises a computation circuit capable of adding said residual signal (R) and said plurality of reconstructed base layer transform coefficients (B).

10. The video decoder set forth in claim 6 wherein said enhancement layer circuitry comprises an enhancement layer decoding circuit capable of receiving said enhancement layer video data and determining therefrom said residual signal (R) and said sign associated with said residual signal (R).

11. For use in a video encoder comprising 1) base layer circuitry capable of receiving an input stream of video frames and generating therefrom compressed base layer video data suitable for transmission to a streaming video receiver and 2) enhancement layer circuitry capable of generating therefrom enhancement layer video data associated with the compressed base layer video data and suitable for transmission to the streaming video receiver, a method of operating the video encoder comprising the steps of:

generating a plurality of original transform coefficients (O) associated with the input stream of video frames;

generating a plurality of reconstructed base layer transform coefficients (B) by quantizing and de-quantizing the plurality of original transform coefficients;

generating from the plurality of original transform coefficients (O) and the plurality of reconstructed base layer transform coefficients (B) a residual signal (R) proportional to a difference between the plurality of original transform coefficients (O) and the plurality of reconstructed base layer transform coefficients (B); and encoding and sending a sign of the residual signal to the streaming video receiver.

12. The method set forth in claim 11 wherein the base layer circuitry comprises a transform circuit capable of generating the plurality of original transform coefficients (O).

13. The method set forth in claim 12 wherein the plurality of original transform coefficients (O) are discrete cosine transform (DCT) coefficients.

14. The method set forth in claim 11 wherein the step of generating a plurality of original transform coefficients (O) comprises the sub-steps of quantizing and de-quantizing the input stream of video frames to thereby generate the plurality of original transform coefficients (O).

15. The method set forth in claim 11 wherein the step of generating the residual signal (R) comprises the step of comparing the plurality of original transform coefficients (O) and the plurality of reconstructed base layer transform coefficients (B).

16. For use in a video decoder comprising 1) base layer circuitry capable of receiving compressed base layer video data, and 2) enhancement layer circuitry capable of receiving enhancement layer video data associated with the compressed base layer video data, a method of operating the video decoder comprising the steps of:

determining from the compressed base layer video data a plurality of reconstructed base layers transform coefficients (B) associated with a quantization of the compressed base layer video data; and determining from the enhancement layer video data a residual signal (R) and a sign associated with the residual signal (R); and reconstructing a plurality of enhancement layer transform coefficients (E) from the residual signal (R) and the plurality of reconstructed base layer transform coefficients (B).

17. The method set forth in claim 16 wherein the enhancement layer circuitry comprises an inverse transform circuit capable of generating from the plurality of reconstructed enhancement layer transform coefficients (E) a plurality of decompressed enhancement layer video frames.

18. The method set forth in claim 17 wherein the inverse transform circuit is an inverse discrete cosine transform (IDCT) circuit.

19. The method set forth in claim 16 wherein the step of reconstructing comprises the step of adding the residual signal (R) and the plurality of reconstructed base layer transform coefficients (B).

20. The method set forth in claim 16 wherein the step of determining the residual signal comprises the step of decoding the received enhancement layer video data and determining therefrom the residual signal (R) and the sign associated with the residual signal (R).

21. A television receiver comprising:

a decoder buffer capable of receiving and storing compressed base layer video data and compressed enhancement layer video data; and a video decoder coupled to said decoder buffer comprising:

base layer circuitry capable of receiving said compressed base layer video data and determining therefrom a plurality of reconstructed base layer transform coefficients (B) associated with a quantization of said compressed base layer video data; and enhancement layer circuitry capable of receiving said compressed enhancement layer video data associated with said compressed base layer video data and determining therefrom a residual signal (R) and a sign associated with said residual signal (R), wherein said enhancement layer circuitry is further capable of reconstructing a plurality of enhancement layer transform coefficients (E) from said residual signal (R) and said plurality of reconstructed base layer transform coefficients (B).

22. The television receiver set forth in claim 21 wherein said enhancement layer circuitry comprises an inverse transform circuit capable of generating from said plurality of reconstructed enhancement layer transform coefficients (E) a plurality of decompressed enhancement layer video frames.

23. The television receiver set forth in claim 22 wherein said inverse transform circuit is an inverse discrete cosine transform (IDCT) circuit.

24. The television receiver set forth in claim 21 wherein said enhancement layer circuitry comprises a computation circuit capable of adding said residual signal (R) and said plurality of reconstructed base layer transform coefficients (B).

25. The television receiver set forth in claim 21 wherein said enhancement layer circuitry comprises an enhancement layer decoding circuit capable of receiving said enhancement layer video data and determining therefrom said residual signal (R) and said sign associated with said residual signal (R).

26. For use in a video processing system capable of receiving compressed base layer video data and enhancement layer video data associated with the compressed base layer video data, computer-executable process steps stored on a computer-readable storage medium for decoding the enhancement layer video data, the computer executable process steps comprising the steps of:

determining from the compressed base layer video data a plurality of reconstructed base layer transform coefficients (B) associated with a quantization of the compressed base layer video data; and determining from the enhancement layer video data a residual signal (R) and a sign associated with the residual signal (R); and reconstructing a plurality of enhancement layer transform coefficients (E) from the residual signal (R) and the plurality of reconstructed base layer transform coefficients (B).

27. The computer-executable process steps stored on a computer-readable storage medium set forth in claim 26 including the further step of generating from the plurality of reconstructed enhancement layer transform coefficients (E) a plurality of decompressed enhancement layer video frames.

28. The computer-executable process steps stored on a computer-readable storage medium set forth in claim 27 wherein the step of generating the plurality of decompressed enhancement layer video frames comprises inverse transforming the plurality of reconstructed enhancement layer transform coefficients.

29. The computer-executable process steps stored on a computer-readable storage medium set forth in claim 28 wherein step of inverse transforming comprises the step of performing an inverse discrete cosine transform (IDCT).

30. The computer-executable process steps stored on a computer-readable storage medium set forth in claim 26 wherein the step of reconstructing comprises the step of adding the residual signal (R) and the plurality of reconstructed base layer transform coefficients (B).

31. A video system comprising:
  a television receiver comprising:
    a decoder buffer capable of receiving and storing compressed base layer video data and compressed enhancement layer video data; and
    a video decoder coupled to said decoder buffer comprising:
      base layer circuitry capable of receiving said compressed base layer video data and determining therefrom a plurality of reconstructed base layer transform coefficients (B) associated with a quantization of said compressed base layer video data; and
      enhancement layer circuitry capable of receiving compressed enhancement layer video data associated with said compressed base layer video data and determining therefrom a residual signal (R) and a sign associated with said residual signal (R), wherein said enhancement layer circuitry is further capable of reconstructing a plurality of enhancement layer transform coefficients (E) from said residual signal (R) and said plurality of reconstructed base layer transform coefficients (B); and
  a video display coupled to said television receiver for displaying video images derived from said base layer video data and said enhancement layer video data containing said inserted all-zero bit plane.

32. The video system set forth in claim 31 wherein said enhancement layer circuitry comprises an inverse transform circuit capable of generating from said plurality of reconstructed enhancement layer transform coefficients (E) a plurality of decompressed enhancement layer video frames.

33. The video system set forth in claim 32 wherein said inverse transform circuit is an inverse discrete cosine transform (IDCT) circuit.

34. The video system set forth in claim 31 wherein said enhancement layer circuitry comprises a computation circuit capable of adding said residual signal (R) and said plurality of reconstructed base layer transform coefficients (B).

35. The video system set forth in claim 31 wherein said enhancement layer circuitry comprises an enhancement layer decoding circuit capable of receiving said enhancement layer video data and determining therefrom said residual signal (R) and said sign associated with said residual signal (R).

36. A transmittable enhancement layer video signal produced by the steps of:
  receiving in base layer circuitry of a video encoder an input stream of video frames and generating therefrom compressed base layer video data suitable for transmission to a streaming video receiver;
  generating a plurality of original transform coefficients (O) associated with the input stream of video frames;
  generating a plurality of reconstructed base layer transform coefficients (B) associated with the plurality of original transform coefficients (O);
  generating from the plurality of original transform coefficients (O) and the plurality of reconstructed base layer transform coefficients (B) a residual signal (R) proportional to a difference between the plurality of original transform coefficients (O) and the plurality of reconstructed base layer transform coefficients (B); and
  encoding a sign of the residual signal and encoding the residual signal to thereby create the transmittable enhancement layer video signal.

37. The transmittable enhancement layer video signal set forth in claim 36 wherein the base layer circuitry comprises a transform circuit capable of generating the plurality of original transform coefficients (O).

38. The transmittable enhancement layer video signal set forth in claim 37 wherein the plurality of original transform coefficients (O) are discrete cosine transform (DCT) coefficients.

39. The transmittable enhancement layer video signal set forth in claim 36 the step of generating a plurality of original transform coefficients (O) comprises the sub-steps of quantizing and de-quantizing the input stream of video frames to thereby generate the plurality of original transform coefficients (O).

40. The transmittable enhancement layer video signal set forth in claim 36 wherein the step of generating the residual signal (R) comprises the step of comparing the plurality of original transform coefficients (O) and the plurality of reconstructed base layer transform coefficients (B).

41. A network system comprising:
  at least one streaming video receiver;
  a streaming video transmitter comprising:
    video encoder comprising:
      base layer circuitry capable of receiving an input stream of video frames and generating therefrom compressed base layer video data suitable for transmission to said at least one streaming video receiver, said base layer video data comprising a plurality of original transform coefficients (O) associated with said input stream of video frames and a plurality of reconstructed base layer transform coefficients (B) associated with said plurality of original transform coefficients; and
      enhancement layer circuitry capable of receiving said plurality of original transform coefficients (O) and said plurality of reconstructed base layer transform coefficients (B) and generating therefrom a residual signal (R) proportional to a difference between said plurality of original transform coefficients (O) and said plurality of reconstructed base layer transform coefficients (B), wherein said enhancement layer circuitry encodes and sends a sign of said residual signal (R) to said at least one streaming video receiver; and
  a variable bandwidth network capable of transporting said base layer video data and said enhancement layer video data from said streaming video transmitter to said at least one streaming video receiver.

42. The network system set forth in claim 41 wherein said base layer circuitry comprises a transform circuit capable of generating said plurality of original transform coefficients (O).

43. The network system set forth in claim 42 wherein said transform circuit is a discrete cosine transform (DCT) circuit.

44. The network system set forth in claim 41 wherein said base layer circuitry comprises a quantization circuit and an inverse quantization circuit capable of generating from said plurality of original transform coefficients (O) said plurality of reconstructed base layer transform coefficients (B).

45. The network system set forth in claim 41 wherein said enhancement layer circuitry comprises a residual computation circuit capable of comparing said plurality of original transform coefficients (O) and said plurality of reconstructed base layer transform coefficients (B).

* * * * *